United States Patent
Reik et al.

(10) Patent No.: US 7,565,850 B2
(45) Date of Patent: Jul. 28, 2009

(54) MOTOR VEHICLE

(75) Inventors: Wolfgang Reik, Bühl (DE); Carsten Bünder, Bühlertal (DE); Robert Fischer, Bühl (DE)

(73) Assignee: LuK Lamellen und Kupplungsbau Beteiligungs KG, Buhl/Baden (DE)

( * ) Notice: Subject to any disclaimer, the term of this patent is extended or adjusted under 35 U.S.C. 154(b) by 1777 days.

(21) Appl. No.: 09/982,136

(22) Filed: Oct. 12, 2001

(65) Prior Publication Data

US 2002/0043419 A1    Apr. 18, 2002

(30) Foreign Application Priority Data

Oct. 13, 2000    (DE) ................ 100 50 945

(51) Int. Cl.
 *F16H 57/02*    (2006.01)
(52) U.S. Cl. .................................... 74/606 R
(58) Field of Classification Search ........... 74/606 R; 192/112, 115

See application file for complete search history.

(56) References Cited

U.S. PATENT DOCUMENTS

| 3,517,789 | A | * | 6/1970 | Gimmler ............. 192/3.21 |
| 4,057,134 | A | * | 11/1977 | Gatewood |
| 4,506,561 | A | * | 3/1985 | Hayakawa .......... 74/606 R |
| 4,641,547 | A | * | 2/1987 | Stich et al. .......... 74/606 R |
| 4,719,812 | A | * | 1/1988 | Machida et al. ........ 74/335 |
| 4,823,637 | A | * | 4/1989 | Taguchi et al. ........ 74/606 R |
| 4,887,344 | A | * | 12/1989 | Kurihara et al. ........ 29/468 |
| 4,924,728 | A |   | 5/1990 | Mori |
| 5,009,125 | A | * | 4/1991 | Machida et al. ....... 74/606 R |
| 5,012,909 | A | * | 5/1991 | Machida et al. ........ 192/3.57 |
| 5,024,306 | A |   | 6/1991 | Fukui et al. |
| 5,090,528 | A |   | 2/1992 | Massel |
| 5,127,287 | A | * | 7/1992 | Taniguchi et al. ...... 74/606 R |
| 5,267,488 | A | * | 12/1993 | Hardeman et al. ...... 74/606 R |
| 5,566,591 | A | * | 10/1996 | Burkett ............... 74/606 R |
| 6,073,517 | A | * | 6/2000 | Pauwels et al. ........ 74/606 R |
| 6,250,411 | B1 | * | 6/2001 | Nesbitt et al. ........... 180/248 |

FOREIGN PATENT DOCUMENTS

GB    2 282 786    *    4/1995

OTHER PUBLICATIONS

Patent Abstracts of Japan, vol. 1998, No. 13, Nov. 30, 1998 & JP 10 205611 A (Mazda Motor Corp), Aug. 4, 1998.
Patent Abstracts of Japan, vol. 014, No. 436, Sep. 18, 1990 & JP 02 173460 A (Hino Motors Ltd), Jul. 4, 1990.
Patent Abstracts of Japan, vol. 015, No. 468, Nov. 27, 1991, & JP 03 199759 A (Aisin AW Co Ltd), Aug. 30, 1991.

* cited by examiner

*Primary Examiner*—Vicky A Johnson
(74) *Attorney, Agent, or Firm*—Darby & Darby P.C.

(57) ABSTRACT

In a motor vehicle with a clutch that is operable in an automated mode, parts (204) of the clutch-actuator and/or the control device of the actuator system are integrated in a carrier element (202) that is installed in an intermediate area between the clutch bell housing (203) and the transmission housing (201).

15 Claims, 3 Drawing Sheets

MOTOR VEHICLE

BACKGROUND OF THE INVENTION

The invention relates to a motor vehicle with a power train that contains an engine, a clutch, and a transmission for converting the rpm-rate and the torque, where the clutch or the transmission or both are designed to be actuated automatically.

In known motor vehicles of the foregoing description, the automated actuation of the clutch requires a multitude of additional components in comparison to a clutch that is directly pedal-operated by the driver. First of all, a drive mechanism is needed to move the clutch. The drive mechanism has to be connected to a power source through power supply conduits. Depending on the principle used in the drive mechanism, the automated actuation can be driven hydraulically, electrically, mechanically, or through a combination of drive principles. As a further practical consideration, the drive mechanism of the automated actuation system needs to receive commands and send feedback signals through signal connections to a controller device. In addition, a multitude of other conduits, cables, as well as electronic and/or hydraulic components may have to be accommodated in the immediate vicinity of the clutch-actuator system.

Thus, a large number of components need to be arranged in the clutch bell housing, which leads to problems due to space limitations.

OBJECT OF THE INVENTION

The present invention therefore has the objective of providing a concept that avoids certain problems associated with an automatically actuated clutch and/or an automatically actuated transmission. This concerns in particular assembly problems as well as the cost- and labor-intensive testing of the assembled system.

SUMMARY OF THE INVENTION

According to the invention, the solution to the foregoing problems lies in an arrangement where at least parts of the actuator device and/or of the control device are integrated in a modular unit in the area between the clutch bell housing and the transmission housing. The integral modular unit may include a carrier element.

Further according to the invention, the one or more drive sources or actuating units may move the clutch and/or the transmission to shift gears, to engage a parking lock, or for other functions. The transmission can be either of a kind where vehicle traction is interrupted during gear shifts, or it can be a so-called power-shifting transmission which delivers at least a partial amount of power to the wheels during a gear shift. Transmissions of the latter kind can also be configured as dual-clutch transmissions.

In a particularly preferred embodiment of the invention, the drive source for actuating the clutch and/or the release system are integrated on a carrier element. In a very advantageous configuration, the carrier element also includes hydraulic conduits and/or electronic components and connections.

In a preferred embodiment, the carrier element forms the rear wall of the clutch bell housing, closing the latter off against the transmission. In a different arrangement, it can also be advantageous if the separating wall between the clutch and the transmission is configured as a portion of the clutch bell or of the transmission housing, in which case the carrier element can be seated on or attached to the separating wall.

In a practical design, the carrier element can be made as a casting, which allows the integrated parts of the actuator device and/or the control device to be molded into the carrier element.

In a first preferred embodiment, the clutch bell housing and the transmission housing are configured as separate components that are joined together by the carrier element.

In a further embodiment, the clutch bell housing and the transmission housing are configured as a single unit or an assembly of connected components, where the carrier element is arranged radially inside the housing wall at the transition between the transmission housing and the clutch bell housing.

According to the preferred embodiment of the invention, the carrier element with the integrated components forms an assembly unit that is designed for a practical pre-assembly, so that it can be installed as a unit in the final assembly process. According to the invention, this concept has the advantage that the pre-assembled unit can be tested.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

The detailed description of the invention given below makes reference to examples that are illustrated in the attached drawings, wherein.

DETAILED DESCRIPTION OF THE INVENTION

Figure 1:
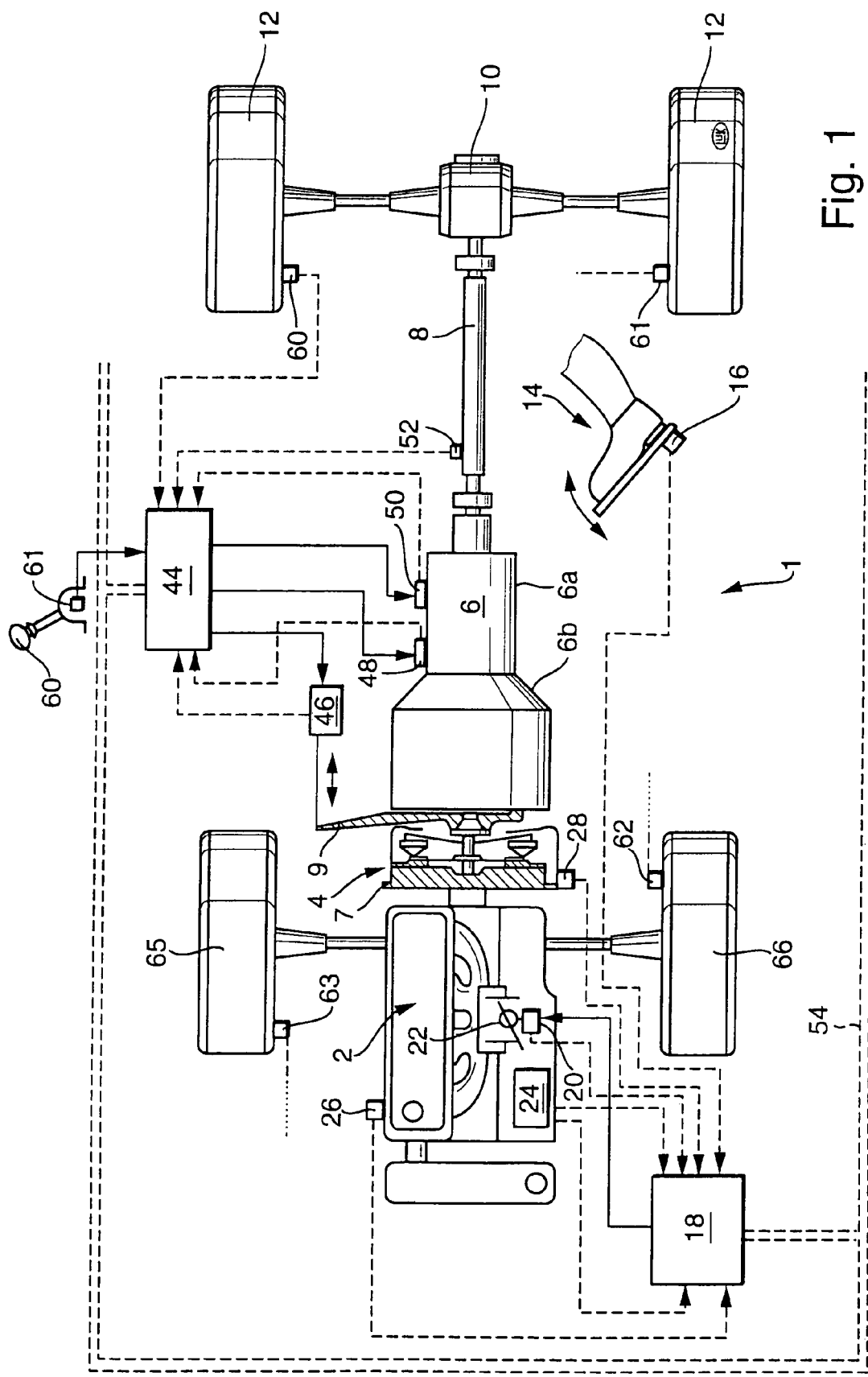
FIG. 1 represents a schematic view of an example of a vehicle with an automatically actuated clutch and an automatically actuated transmission.

FIG. 1 schematically illustrates an example of a vehicle 1 with a clutch 4 and a transmission 6. The transmission housing 6a is connected to the clutch bell housing 6b which, in turn, is connected to the engine block of the engine 2. In the schematic view of FIG. 1, the clutch 4 is shown apart from the clutch bell housing 6b for better clarity. The clutch 4 is arranged in the torque flow between the engine 2 and the transmission 6. In practical design configurations, a two-part flywheel mass may be interposed between the engine and the clutch. The two masses are rotatable within a limited range in relation to each other, coupled by a spring damper in an arrangement that improves in particular the oscillatory behavior of the power train. In preferred embodiments, the present invention is used in combination with a damper device performing one or more of the functions of absorbing, smoothing, compensating or attenuating rotary shocks and damping vibrations. Suitable devices of this kind are described in particular in the publications DE-OS 34 18 671, DE-OS 34 11 092, DE-OS 34 11 239, DE-OS 36 30 398, DE-OS 36 28 774, and DE-OS 37 21 712 of the assignee of the present invention. The motor vehicle 1 in the illustrated embodiment is powered by an engine 2, shown here as an internal combustion engine such as an Otto-cycle engine or a diesel engine. In other embodiments, the drive source may also be a hybrid drive, an electric motor, or a hydrogen-powered engine. The clutch 4 in the illustrated embodiment is a friction clutch which allows the engine to be uncoupled from the transmission, particularly in a start-up phase or to shift gears. A clutch-release system 9 serves to vary the degree of clutch engagement and thereby control the amount of torque that is transmitted through the clutch. A clutch plate and a pressure plate are moved towards or apart from each other along the axial direction, so that the plates exert a varying amount of pressure on a friction disc arranged between them and the friction disc is taken along to share the rotation of the plates to a greater or lesser extent.

Preferably, the clutch 4 is of a self-adjusting type, where the wear of the friction linings is compensated in such a manner that the moderate amount of force required to operate the release system 9 remains unchanged. Preferably, the invention is used in combination with the type of friction clutch that is described in the German patent applications DE-OS 42 39 291, DE-OS 42 39 289, and DE-OS 43 06 505 of the assignee of the present invention. The wheels 12 of the vehicle 1 are driven by way of a drive shaft 8 and a differential 10. The driven wheels 12 are equipped with rpm sensors 60, 61 (in some cases with only a single sensor 60 or 61), generating a signal corresponding to the rate of rotation of the wheels 12. In addition or as an alternative, a sensor 52 is arranged at another appropriate location in the power train, e.g., at the drive shaft 8, to determine the output rpm rate of the transmission. The input rpm rate of the transmission can be measured by another sensor, or it can also be determined from the engine rpm rate, as is the case in the illustrated embodiment. The rpm data could be used, e.g., to determine the transmission ratio. The friction clutch 4 which in the illustrated example is disengaged by a pushing force, but could also be designed to work with a pulling force, is moved in and out of engagement by means of an actuator device 46, such as a clutch actuator. The transmission 6 is operated by means of an actuating system with two actuators 48 and 50. One of the actuators moves along the neutral plane of the transmission to select between the legs of a shift-gate pattern, while the other actuator shifts back and forth between the two gears of a selected leg of the shift gate. The clutch actuator 46 and/or the transmission actuators 48, 50 are powered by DC motors, but in other embodiments it may also be appropriate to use a hydraulic actuating system, especially if large actuating forces are required. The clutch 4 and the transmission 6 are controlled by a control device 44 which may appropriately be designed as a unit together with the clutch actuator 46. In another embodiment, it may also be advantageous to arrange the control device 44 at another location in the vehicle. The clutch 4 and the transmission 6 can work in an automatic mode under the control of the control device 44, or in a manual mode under the control of the driver by means of a shift selector device 60 such as a shift lever, where the selection is registered by means of a sensor 61. In the automatic mode, the changes from one gear ratio to another are effected through appropriate commands to the actuators 46, 48 and 50 according to characteristic patterns that are stored in a memory of the control device 44. A plurality of shift-control programs are available to the driver, each defined by at least one characteristic driving pattern. For example, a sport mode provides optimized engine performance; an economy mode provides optimized fuel economy; and a winter mode provides optimized driving safety. Furthermore, the characteristic driving patterns are adaptive in the presently described embodiment, meaning that they can be automatically adapted to the habits of the driver and/or to other outside parameters such as the adhesion of the tires to the pavement, outside temperature, etc. A control device 18 controls the engine 2 by influencing the intake rate and composition of the fuel mixture. This function is symbolically represented by a throttle valve 22 whose aperture angle is detected by an angle transducer 20 and communicated as a sensor signal to the control device 18. In other designs of the engine control, at least for combustion engines, a different sensor signal may be used by the control device 18 to determine the composition and/or flow rate of the fuel mixture. If the vehicle is equipped with a lambda sond™ (oxygen sensor), its signal is also fed to the control device 18. In the present example, the control device 18 further receives a signal from a sensor 16 indicating the position of an engine-load control lever (gas pedal) 14, an engine rpm signal from an rpm sensor 28 at the engine output shaft, a pressure signal of a vacuum sensor 26 at the engine intake, as well as a temperature signal of a temperature sensor 24 for the engine coolant. The control devices 18 and 44 can be accommodated in areas that are spatially and/or functionally separate, in which case it is practical to connect them through an electrical data connection such as a CAN (central area network) bus 54 or another type of interface connection. However, it may also be advantageous to combine the functional areas of the control devices, because not every function can be clearly assigned to either one or the other, and because the different functions have to cooperate with each other. In particular, the control device 44 can control the engine 2 with regard to rpm rate and/or torque output during certain phases of a gear shift. The clutch actuator 46 as well as the transmission actuators 48 and 50 provide signals to the control device 44 from which the position of the respective actuator can at least be derived indirectly. In the present example, the position-sensing takes place inside the actuator. An incremental transducer is used, which determines the actuator position in relation to a reference point. In other embodiments, it may also be appropriate to arrange the transducer outside of the actuator and/or to determine the absolute position, e.g., with a potentiometric sensor. The determination of the actuator position is particularly important for the clutch actuator, because it allows the point of engagement of the clutch 4 to be correlated with a specific amount of clutch travel and thus with a specific actuator position. It is advantageous to determine the engagement point of the clutch 4 when the vehicle is first put into operation and again at repeated intervals, particularly in correlation with changing parameters such as clutch wear, clutch temperature, etc. The determination of the transmission actuator positions is important in that the latter indicate the currently engaged ratio level of the transmission. The control device 44 further receives signals from rpm sensors 62 and 63 of the non-driven wheels 65 and 66. It can be useful to determine the traveling speed of the vehicle from the average rpm rate of either the sensors 62, 63 or the sensors 60, 61, cancel the differences in rpm rates when the vehicle travels around a curve. The rpm signals serve to calculate the vehicle speed and also to recognize a slipping condition. Output connections to the control devices are shown as solid lines in FIG. 1, while input connections are represented by broken lines. The signal connections of the sensors 61, 62 and 63 to the control device are only partially indicated.

In vehicles with a clutch 4 and a transmission 6, the transmission is normally arranged inside a transmission housing 6a. The latter adjoins a clutch bell housing 6b that contains the clutch and forms the connection between the transmission housing 6a and the engine block. The transmission housing 6a and the clutch bell housing 6b define two spaces that are separated by a wall and accommodate the transmission and the clutch, respectively. The separating wall can also be the boundary between two separate components, so that the clutch bell housing 6b is configured as one component and the transmission housing 6a as another component. Designs where the clutch bell housing 6b and the transmission housing 6a are one integral part are also used in practice, likewise with a separating wall between the housing compartments 6a and 6b.

Figure 2:
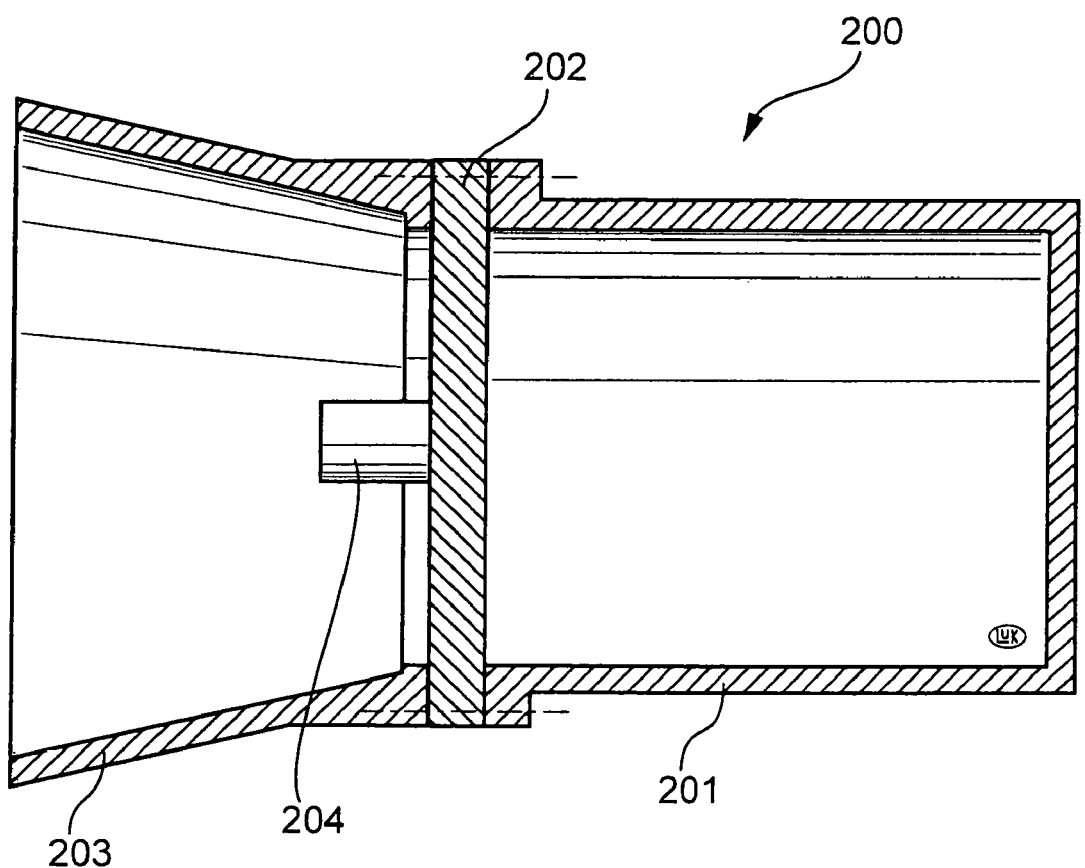
FIG. 2 represents a schematic view of an example where a carrier element is installed between a transmission housing and a clutch bell housing.

FIG. 2 gives a schematic view of an example of a transmission housing 201 and a clutch bell housing 203, with a carrier element 202 installed between the two housings. In this embodiment, the transmission housing 201 and the clutch bell housing 203 are configured as separate components, and the carrier element is arranged between the transmission housing 201 and the clutch bell housing 203 along the axis of the torque flow. In the illustrated design example of the invention, the carrier element 202 forms the separating wall between the transmission housing 201 and the clutch bell housing 203, i.e., it serves as the rear wall of the clutch bell housing 203, which is a particularly advantageous arrangement. In another advantageous embodiment, the clutch bell housing 203 is designed with its own rear wall, or a separating wall is provided between the transmission housing 201 and the clutch bell housing 203, with the carrier element 202 located at the boundary in addition to the separating wall. In this case, the carrier element 202 can be of a less robust design, because it has no enclosure function. The carrier element can be supported by the separating wall, attached to the separating wall itself and/or to radially adjacent portions of the transmission housing 201. In a case where the transmission housing 201 and the clutch bell housing 203 are configured in one piece, the carrier element 202 can be installed in the transition area between the transmission housing 201 and the clutch bell housing 203. The carrier element 202 can again function as a separating wall, or it can be supported by and attached to an existing divider wall. A release actuator 204 is integrated in the carrier element 202 as symbolically indicated in FIG. 2.

Figure 3:
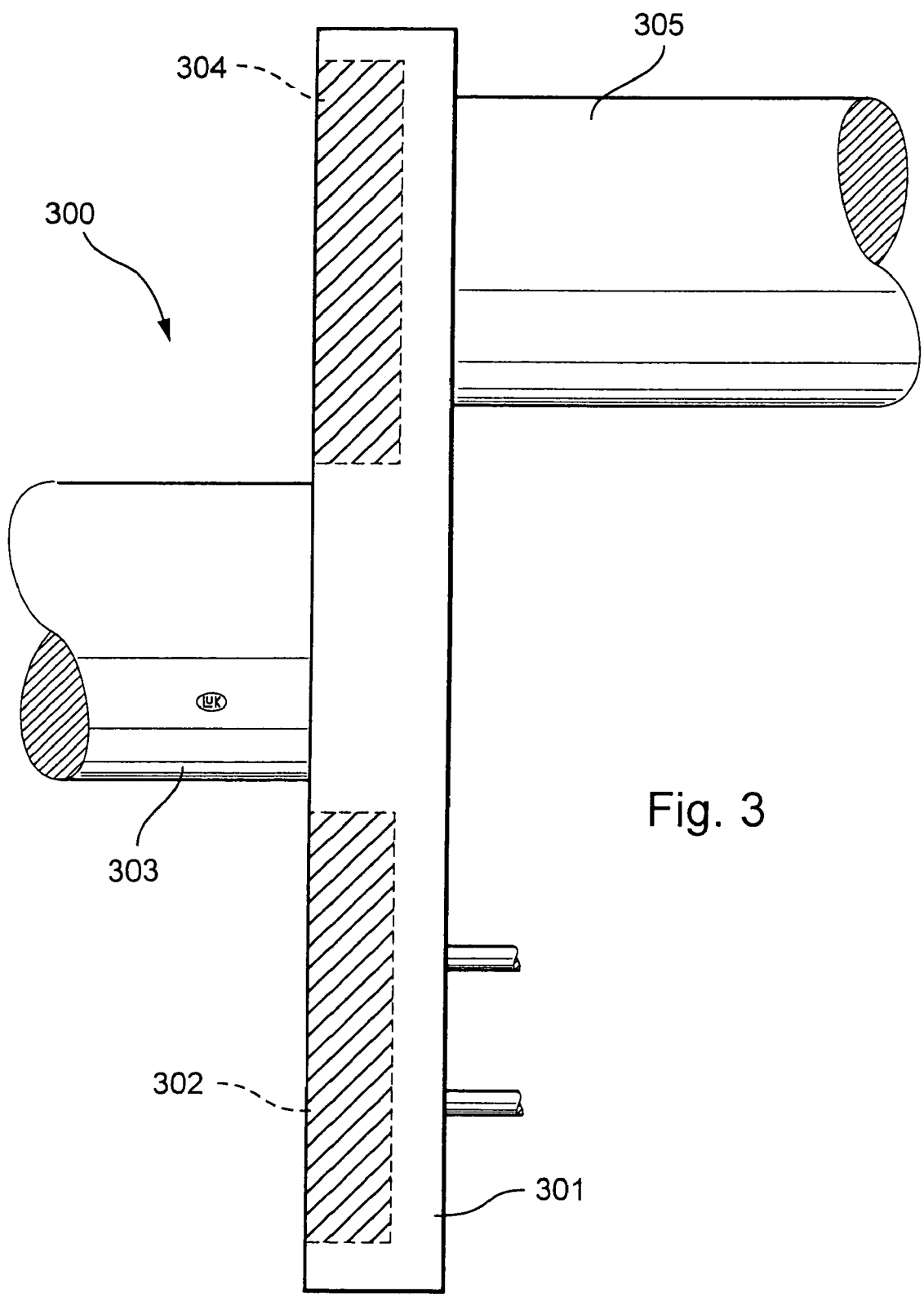
FIG. 3 represents a detail view of the carrier element.

FIG. 3 gives a detail view of a carrier element 301. Hydraulic and/or electronic elements 302, 304 are integrated in the carrier element 301. The latter is designed preferably as a casting, such as a steel casting, iron casting, or in particular as a tempered casting. In other embodiments, it can also be very practical to make the carrier element of a preferably fiber-reinforced polymer material. A sandwich-like design of the carrier element 301 has proven to be very advantageous. The hydraulic and/or electronic elements 302, 304 can be integrated in the carrier element 301 by molding the conducting elements and/or operating elements into the polymer material or by providing channels and/or cavities and recesses in the carrier element to accommodate the conducting and/or operating elements such as electronic components or hydraulic valves, cylinders, throttles, etc. It is particularly advantageous, if the carrier element forms the housing for an integrated hydraulic cylinder. FIG. 3 further illustrates a release mechanism/actuator 303 that is integrated in the carrier element, and also an integrated electrical shift module 305. In other embodiments, the integrated shift module can also work hydraulically or mechanically. The carrier element 301 with the integrated elements 302, 303, 304, 305 is designed as an assembly unit 300 that can be preassembled by itself and united with the transmission housing 201 and/or the clutch bell housing 203 in a final assembly process. As a particular advantage of the preassembly concept, the assembly unit 300 can be functionally tested before it is installed in the final assembly.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A motor vehicle comprising an engine with an engine block; a clutch with a clutch-actuator device including at least one element from the group of hydraulic, mechanical and electronic elements, the clutch actuator device including a clutch-release device with at least one clutch-release drive source; a transmission adjacent to the clutch; a transmission housing surrounding the transmission; a clutch bell housing surrounding the clutch; a control device; and a slab-shaped carrier element in which at least portions of at least one of the clutch-actuator device and the control device are integrated so as to form a modular unit and thereby conserve space as well as facilitate assembly and testing; wherein the transmission housing is connected to the clutch bell housing and the latter is, in turn, connected directly to the engine block; the control device is operable to control at least the clutch in an automated mode; and said carrier element is arranged in an intermediate area between the clutch bell housing and the transmission housing.

2. The motor vehicle of claim 1, wherein the clutch-release drive source is integrated in the carrier element.

3. The motor vehicle of claim 1, wherein the clutch release device is integrated in the carrier element.

4. The motor vehicle of claim 1, wherein the clutch actuator device comprises hydraulic conduits and hydraulic elements and at least part of said hydraulic conduits and elements are integrated in the carrier element.

5. The motor vehicle of claim 4, wherein the hydraulic elements comprise at least one of a hydraulic valve and a hydraulic cylinder.

6. The motor vehicle of claim 1, wherein the carrier element functions as a rear wall that closes off the clutch bell housing towards the transmission.

7. The motor vehicle of claim 1, wherein the clutch bell housing comprises a rear housing wall and the carrier element is arranged to lie against the rear housing wall.

8. The motor vehicle of claim 1, wherein the carrier element is made as a casting.

9. The motor vehicle of claim 8, wherein the casting is from the group consisting of steel castings, iron castings and tempered castings.

10. The motor vehicle of claim 8, wherein the actuator device has parts that are integrally molded into the casting.

11. The motor vehicle of claim 10, wherein the carrier device with the integrally molded-in parts forms an assembly unit.

12. The motor vehicle of claim 11, wherein the assembly unit is preassembled.

13. The motor vehicle of claim 12, wherein the assembly unit is tested before being installed.

14. The motor vehicle of claim 1, wherein the clutch bell housing and the transmission housing are made as separate components and the carrier element forms a connection between the clutch bell housing and the transmission housing.

15. The motor vehicle of claim 1, wherein the clutch bell housing and the transmission housing are connected as a housing unit and the carrier element is arranged inside said housing unit in a transition area between the clutch bell housing and the transmission housing.

* * * * *